US012798320B2

(12) United States Patent
Light et al.

(10) Patent No.: US 12,798,320 B2
(45) Date of Patent: Nov. 17, 2026

(54) DYNAMIC GROUNDHOOK CONTROL IN A VEHICLE USING AN ACTIVE SUSPENSION SYSTEM

(71) Applicant: ClearMotion, Inc., Billerica, MA (US)

(72) Inventors: Timothy Vernon Light, Tamworth (GB); Robert Fern, Warwickshire (GB); Alex Cutler, Cheltenham (GB)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 19/110,295

(22) PCT Filed: Sep. 11, 2023

(86) PCT No.: PCT/US2023/073901
§ 371 (c)(1),
(2) Date: Mar. 10, 2025

(87) PCT Pub. No.: WO2024/059522
PCT Pub. Date: Mar. 21, 2024

(65) Prior Publication Data

US 2026/0091635 A1 Apr. 2, 2026

Related U.S. Application Data

(60) Provisional application No. 63/438,134, filed on Jan. 10, 2023, provisional application No. 63/405,645, filed on Sep. 12, 2022.

(51) Int. Cl.
*B60G 17/0165* (2006.01)

(52) U.S. Cl.
CPC .... *B60G 17/0165* (2013.01); *B60G 2400/102* (2013.01); *B60G 2400/1062* (2013.01);
(Continued)

(58) Field of Classification Search
CPC .......... B60G 17/0165; B60G 2400/102; B60G 2400/1062; B60G 2400/202;
(Continued)

(56) References Cited

U.S. PATENT DOCUMENTS 8,840,118 B1 9/2014 Giovanardi
9,440,507 B2 9/2016 Giovanardi et al.
(Continued)

OTHER PUBLICATIONS

International Search Report and Written Opinion for International Application No. PCT/US2023/73901 mailed Jan. 23, 2024.

*Primary Examiner* — Jacob M Amick
(74) *Attorney, Agent, or Firm* — Wolf, Greenfield & Sacks, P.C.

(57) ABSTRACT

A vehicle may include a vehicle body, a plurality of wheels, an active suspension system operatively coupled to the plurality of wheels and the vehicle body, and at least one processor configured to control the active suspension system. The at least one processor may be configured to determine a first force command based on a vehicle body parameter, determine a second force command based on the vehicle body parameter and a suspension parameter, determine a blend ratio based on the first force command, determine a third force command based at least partly on the blend ratio, the first force command, and the second force command, and command the at least one actuator to apply force between at least one of the plurality of wheels and the vehicle body based at least partly on the third force command.

33 Claims, 5 Drawing Sheets

(52) U.S. Cl.
CPC .... *B60G 2400/202* (2013.01); *B60G 2400/64* (2013.01); *B60G 2400/82* (2013.01); *B60G 2400/92* (2013.01); *B60G 2600/182* (2013.01); *B60G 2600/604* (2013.01)

(58) Field of Classification Search
CPC ............ B60G 2400/64; B60G 2400/82; B60G 2400/92; B60G 2600/182; B60G 2600/604
See application file for complete search history.

(56) References Cited

U.S. PATENT DOCUMENTS

| | | | | |
|---|---|---|---|---|
| 2005/0085970 | A1* | 4/2005 | Song | B60G 17/018 280/5.5 |
| 2014/0214274 | A1 | 7/2014 | Liu et al. | |
| 2014/0297117 | A1 | 10/2014 | Near et al. | |
| 2017/0274724 | A1* | 9/2017 | Liu | B60G 17/01933 |
| 2022/0105769 | A1* | 4/2022 | Chetty | B60G 17/018 |
| 2022/0118810 | A1 | 4/2022 | Anderson et al. | |

* cited by examiner

DYNAMIC GROUNDHOOK CONTROL IN A VEHICLE USING AN ACTIVE SUSPENSION SYSTEM

RELATED APPLICATIONS

This application is a national stage filing under 35 U.S.C. § 371 of International Patent Application Serial No. PCT/US2023/073901, filed Sep. 11, 2023, which claims the benefit of priority under 35 U.S.C. § 119(e) of U.S. Application Ser. No. 63/438,134, filed Jan. 10, 2023 and U.S. Application Ser. No. 63/405,645, filed Sep. 12, 2022. The entire contents of these applications are incorporated herein by reference in their entirety.

FIELD

Disclosed embodiments are related to dynamic groundhook control in a vehicle using an active suspension system as well as related methods.

BACKGROUND

Suspension systems are typically designed to properly support and orient a vehicle, provide safe handling in various expected operating environments and ensure a comfortable ride for occupants. Conventional suspension systems are typically passive with largely constant operating and performance parameters. Some suspension systems are semi-active in that their overall response can be adjusted by altering the damping forces applied by these semi-active systems, for example, to offer a trade-off between occupant comfort and vehicle handling. Fully active suspension systems use actuators to react to changing road conditions using a combination of active and damping forces, depending on the operating mode, that are controlled using inputs from sensors and other measurement devices.

SUMMARY

In some embodiments, a vehicle comprises a vehicle body, a plurality of wheels, an active suspension system operatively coupled to the plurality of wheels and the vehicle body, where the active suspension system comprises at least one actuator configured to apply active forces to at least one of the plurality of wheels in at least one mode of operation, and at least one processor configured to control the active suspension system. The at least one processor is configured to determine a first force command based on a vehicle body parameter, determine a second force command based on the vehicle body parameter and a suspension parameter, determine a blend ratio based on the first force command, determine a third force command based at least partly on the blend ratio, the first force command, and the second force command, and command the at least one actuator to apply force between at least one of the plurality of wheels and the vehicle body based at least partly on the third force command.

In some embodiments, a method of controlling a vehicle comprises determining a first force command based on a vehicle body parameter, determining a second force command based on the vehicle body parameter and a suspension parameter, determine a blend ratio based on the first force command, determining a third force command based at least partly on the blend ratio, the first force command, and the second force command, and commanding at least one actuator of an active suspension system to apply active force between at least one of a plurality of wheels of the vehicle and a vehicle body of the vehicle based at least partly on the third force command.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
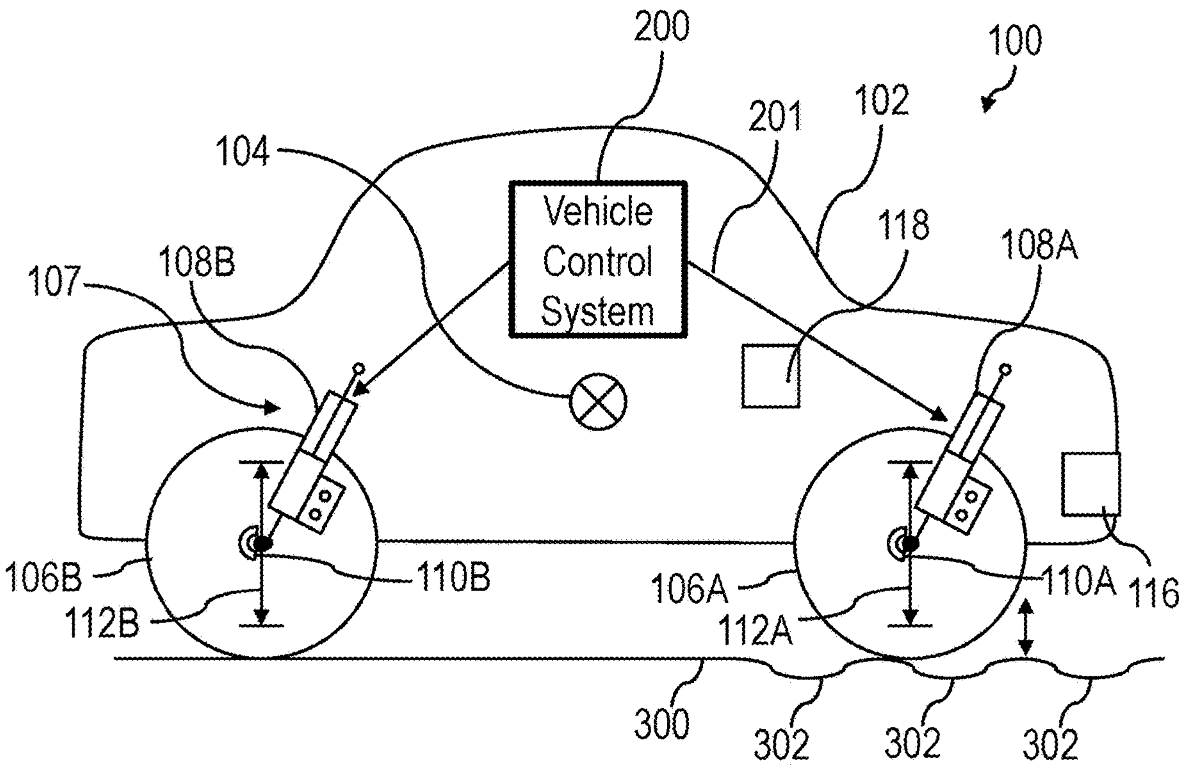
FIG. 1 is a schematic of one embodiment of a vehicle including an active suspension system.

In conventional vehicles, a vehicle suspension may be responsible for control of a plurality of vehicle motion parameters. Such vehicle motion parameters may include, but are not limited to, roll, heave, pitch, and twist. In some cases, an active suspension may be employed in a vehicle to provide for active control of one or more of these or other vehicle motion parameters. In some cases, active suspension systems that deliver excellent comfort isolation control on small road inputs can suffer poor performance on large road events (e.g., hills, dips, large bumps, etc.) where, for example, a magnitude of the road event exceeds the capacity of the suspension travel. In some cases, an active suspension system may be employed to isolate the vehicle body from external disturbances (e.g., skyhook control), such that a center of mass of the vehicle body remains at a substantially constant or effectively substantially constant elevation despite external disturbances. Such vehicle control may sometimes result in a wheel of the vehicle reaching end of travel (e.g., exceeding a wheel travel threshold), because the isolation control uses an excessive amount of suspension travel to compensate for the large magnitude road event. Reaching the end of travel may result in noise or an abrupt transfer of force to the vehicle body, which may be undesirable. Accordingly, the inventors have recognized that there is a need for isolation control of a vehicle body using an active suspension system to adapt to the conditions present on a road surface to avoid reaching end of suspension travel. The inventors have further recognized the benefits of a vehicle body isolation control methodology that is robust to work effectively on a wide range road surfaces and for a wide variety of road events to maintain user comfort while avoiding the suspension system reaching an end of travel.

In addition to the above, the inventors have appreciated the challenges of trying to predict and compensate future movement of a vehicle, for example, with limited to no forward-looking information. Conventional suspension systems may apply a constant control methodology that may reduce the overall performance of the suspension system while remaining applicable to effectively all conditions that may be encountered on a road network. In contrast, the inventors of the instant application have recognized the benefits of a control methodology that adapts to different road conditions using current information (e.g., with limited to no forward-looking information) to improve suspension performance. In particular, the inventors have recognized the benefits of providing enhanced vehicle body isolation for a greater variety of road conditions, for example, by using previously measured information related to a road surface. For example, the inventors have recognized that a suspension system control methodology that operates well for isolating small bumps may not work well when encountering, e.g. hills or inclines. According to this example, an isolation control module, operating without forward-looking information, may initially mistakenly conclude the hill is a small bump based on current information, resulting in a suspension response that is ultimately not appropriate for a hill (e.g., reaching end of travel, upsetting the vehicle body, etc.). The inventors have recognized this problem, and the systems and methods of exemplary embodiments herein provide a technical solution to suspension control for improved isolation control in a variety of road conditions. However, it should be understood that instances in which the systems and methods disclosed herein are implemented with vehicles aided by forward-looking sensors during a current traverse of a road, or by information about the road ahead of the vehicle collected during previous traverses of the road, are also contemplated.

In view of the foregoing, the inventors have recognized the benefits of a vehicle control system that dynamically blends vehicle body isolation and road tracking control outputs of the vehicle control system. On road surfaces with small magnitude road events (e.g., events causing a suspension response less than reaching an end of travel) the blend may be biased towards vehicle body isolation control (e.g., skyhook control), which may increase passenger comfort by reducing or eliminating overall vehicle body motion due to vibrations applied to the vehicle body by disturbances from various types of road events. On road surfaces with large magnitude road events (e.g., events which may cause a suspension response equal to or greater than reaching an end of travel) the blend may be biased towards road tracking control (e.g., groundhook control). Road tracking control may aim to maintain the vehicle body at a determined elevation relative to the road surface profile. Road tracking control may prevent end of travel events within the active suspension. The blend between vehicle body isolation control (e.g., skyhook) and road tracking control (e.g., groundhook), may result in a controller that may dynamically shift between stiff vehicle body isolation control (e.g., "stiff skyhook") where vehicle body isolation is favored more heavily and weak vehicle body isolation control (e.g., "weak skyhook") where road tracking control is favored more heavily. Such a vehicle control system may deliver robust comfort control on a range of road surfaces and may help to avoid the occurrence of end of suspension travel events without significantly diminishing user comfort. Additionally, such a vehicle control system may be simple to implement and, in some embodiments, may not necessarily require direct monitoring of the position of the suspension system relative its range of motion to achieve the desired reduction in the number and/or intensity of end of travel events.

In some embodiments, a vehicle may include a vehicle body, a plurality of wheels, and an active suspension system operatively coupled to the plurality of wheels and the vehicle body. The active suspension system may include at least one actuator configured to apply active forces to at least one of the plurality of wheels in at least one mode of operation. The vehicle may include at least one processor configured to control the active suspension system, and in particular the active and/or damping forces applied by the active suspension system between the wheel(s) and the vehicle body to affect the response of the vehicle chassis or body while driving along a road surface. In some embodiments, the at least one processor may operate a first suspension control module and a second suspension control module. The suspension control modules may be operated based on one or more inputs, where an output of each suspension control module is a force command usable to command the at least one actuator to apply active and/or damping forces between the vehicle body and wheel(s). The first suspension control module may be an isolation control module and may provide a first force command based at least in part on an input including a vehicle body parameter (e.g., vehicle body velocity). Accordingly, the first force command may be a force command intended to avoid vehicle body motion as the vehicle encounters road features (e.g., bumps, potholes, etc.) that may cause motion of the vehicle body (e.g., skyhook control). The second suspension control module may be a tracking control module and may provide a second force command based at least in part on an input including vehicle body parameter(s) and/or suspension parameter(s) (e.g., suspension velocity). Accordingly, the second force command may be a force command intended to maintain the vehicle body at a fixed position (in the vertical direction) relative to the ground with limited isolation relative to external disturbances (e.g., groundhook control or weak skyhook control).

The inventors have recognized that multiple force commands (e.g., the above noted first force command and second force command) may be blended by the at least one processor according to a blend ratio to produce a blended (e.g., third) force command that may be used to operate the at least one actuator of the active suspension system. In some embodiments, the blend ratio may be varied based on the output of the first suspension control module to vary a relative weighting of e.g., the first and second forces used to provide the blended (e.g., third) force. For example, a large increase in the output of the first force controller module may be associated with a large magnitude disturbance like a hill rather than a lesser magnitude disturbance like a bump, and accordingly the blend ratio may be adjusted to more heavily weight the output second force from the second suspension control module to provide the blended force command. In this manner, a combination of isolation control and ground tracking control may be employed dynamically and automatically based on the output of an isolation control module to increase overall isolation performance while helping to avoid, or eliminate, undesirable events like reaching end of wheel travel (e.g., exceeding a threshold wheel travel).

According to exemplary embodiments disclosed herein, an isolation control module (e.g., a first control module) may be tuned to provide a first level (e.g., a maximum) isolation of the vehicle chassis or body from road inputs. The control goal of the isolation control module may be to avoid the vertical acceleration of the vehicle body for one or more motion parameters of the vehicle body (e.g., heave, pitch, roll, etc.). Such isolation control may be known as "skyhook" control. Skyhook control may be implemented to keep the vehicle body flat while absorbing road inputs with the suspension travel. In some implementations, when there is sufficient suspension travel to allow for the force commands requested by the isolation control module, this control strategy may work well in an active suspension system. However, as discussed above, during large road inputs this type of control module may result in excessive suspension travel, creating vulnerability to end stop impacts (e.g., a wheel reaching an end of suspension travel). In some embodiments, a suspension travel range for a vehicle may be ±7 cm (a total of 14 cm suspension travel from end to end). In other embodiments, any suspension travel range may be employed on a vehicle including travel ranges greater than or less than ±7 cm. A tracking control module (e.g., a second control module) may be tuned to include some "groundhook control", providing reduced levels of isolation of road inputs for the vehicle body as compared to the isolation control module. In contrast, groundhook control may work to keep the vehicle body at a set distance from the underlying road surface. Thus, in some embodiments, the tracking control module may be configured to deliver a moderate level of vehicle body isolation to road inputs, but with reduced suspension travel. In some embodiments, to avoid abrupt transitions in suspension control, the contribution of the groundhook control may be made less abrupt by use of a non-linear gain curve. Additionally, in some embodiments, the tracking control module may have greater damping provided in rebound, compared to compression.

It should be noted that while an isolation control module and tracking control module may be described herein as implementing skyhook control or groundhook control, respectively, in some embodiments control modules may implement a blend of skyhook control and groundhook control. In some such embodiments, an isolation control module may more heavily weight skyhook control compared to groundhook control. In some embodiments, a tracking control module may more heavily weight groundhook control compared to skyhook control.

To help implement the relative weighting of the different suspension control modules, the inventors have recognized the benefits of a blending module including appropriate decision logic that blends the outputs of the isolation and tracking controller modules. The blend of the outputs of the two control modules may be, for example, determined by monitoring the magnitude and frequency characteristics of the isolation control force. This methodology relies on the property that the output of the isolation control module is strongly correlated with suspension travel. When the isolation control module outputs (e.g., force commands) are small or short in duration full isolation control may be implemented. However, when the isolation control module outputs (e.g., force commands are large, a prolonged period of tracking control may be implemented according to a blend ratio. The blend ratio may be, for example, formulaic and computed automatically, based on the information from the isolation control module and/or other inputs regarding the vehicle. In this manner, the overall control of an active suspension of a vehicle may change in real time to adjust to isolating small road features (e.g., bumps, potholes, etc.) or compensating for large road features (e.g., hills) while avoiding undesirable events like reaching end of wheel travel (e.g., exceeding a wheel travel threshold). While embodiments herein describe an isolation control module and a tracking control module, the methodology described herein may be applicable to combining any plurality of control module outputs. That is, embodiments described herein may be applicable to a wide variety of control module combinations associated with various parameters.

In some embodiments, to represent transitioning between an isolation control module and a tracking control module, a blend ratio may be employed. In some embodiments, the blend ratio may be a value representing the contributions of the outputs from one or more of the control modules to an overall force command. For example, a blend ratio may be a ratio of tracking control to isolation control, where the blend ratio may be between or equal to 0 and 1 in some embodiments. In such an embodiment, 0 may indicate full isolation module control (e.g., an overall force command output is equal to the isolation control module force command output) while 1 indicates full tracking module control (e.g., an overall force command output is equal to the tracking control module force command output). Of course different ranges for a blend ratio both greater and less than those noted above may also be used.

In some embodiments, a blend ratio may be tuned via a notch filter, PI filter and/or dead-zone parameters described further herein. Such modifiers may shape the desired sensitivity to different frequency and magnitude content for the different control modules. In some embodiments, the blend ratio may be employed to create a linear blend of tracking control module and isolation control module output forces to generate an overall force command. In some cases, this may create a composite force signal that delivers a robust comfort mode on a variety of road surfaces, while reducing or minimizing end of travel events. In other embodiments, the blend ratio may be non-linear, polynomial, or represent another relationship to combine the outputs of two controllers into an overall output. For example, in some embodiments the blend ratio may represent a weighting or scale between the force commands of two controllers to generate an overall force command. The blend ratio value may vary linearly based on a first control module output, may vary non-linearly based on a first control module output, and/or may vary based on another function of the first control module output.

In some embodiments, a raw blend ratio may vary rapidly as it is a function of the instantaneous isolation force command. Accordingly, the inventors have recognized the benefits of suppressing repeated cycling between full tracking and full isolation control with a hit/hold module. In some embodiments, the hit/hold module may set the blend ratio to a predetermined level for a threshold period of time when a threshold output from a first control module is detected. For example, a hit/hold module may set a blend ratio to provide for full tracking state (e.g., with zero contribution from the isolation control module) for a suitable period of time during larger events (e.g., greater than or equal to 1 second). In some embodiments, the blend ratio may be further smoothed to avoid repeated cycling by implementing a low-pass filter. The low-pass filter may remove high frequency content that may be undesirable to obtain a filtered blend ratio that is used to determine the overall blended force output.

In some embodiments, inputs to various control modules described herein may be provided by one or more sensors onboard a vehicle or from on-board or remote databases. In some cases, multiple sensors and/or redundant sensors may be employed to provide information (e.g., current and/or preview information) from which a force command may be determined by a control module (e.g., via proportional, integral, and/or derivative control). Sensors may provide information associated with different components of the vehicle, including e.g., wheels, suspension components, vehicle body components, user interface components, transmission components, engine components, etc. In some embodiments, one or more accelerometers may be employed to provide acceleration information regarding a vehicle component. For example, an accelerometer may be disposed on the vehicle body which may be provide vehicle body acceleration information or vehicle body velocity information (e.g., via the integral of the acceleration). In some embodiments, information from one or more accelerometers on the vehicle body may be employed to determine inertial heave, pitch and roll velocity of the vehicle body, each of which are parameters that may be employed for skyhook control. As another example, one or more accelerometers may be disposed on one or more components of a vehicle suspension and/or wheel assembly and may be configured to provide suspension acceleration information (e.g., in a direction of travel such as a vertical direction) and suspension velocity information (e.g., via the integral of the acceleration). In some embodiments, information from one or more accelerometers on the suspension may be employed to determine suspension heave, pitch and roll velocity with respect to the road surface, each of which are parameters that may be employed for groundhook control. Other sensors may also be employed, including encoders, potentiometers, and/or other appropriate types of sensors on any appropriate portion of a vehicle to sense position, velocity, and/or acceleration information of the associated portion of the vehicle. In some embodiments, a suspension actuator may provide feedback information to a control module regarding its force output, position, velocity, and/or acceleration. In view of the above, any suitable inputs and sensors may be employed as inputs for controllers described herein, as the present disclosure is not so limited.

In some embodiments, control modules described herein may be vehicle level control modules. That is, the control modules may output an overall force command for the suspension system to execute. A suspension may include one or more actuators, and this overall force command may be allocated to individual actuators to achieve the overall force command and desired overall response of the vehicle body. In some embodiments, methodologies described herein may be applicable to control of a vehicle at a per-corner or per-actuator level following the blending process described according to exemplary embodiments herein. Corresponding to the described vehicle level control, in some embodiments inputs to the control modules described herein may also be at the vehicle level. For example, in some embodiments, information from individual sensors (e.g., associated with an individual wheel or actuator) may be combined with information from other sensors to provide overall information regarding the motion of the overall vehicle body or overall vehicle suspension system. For example, individual inputs regarding a suspension system associated with a single wheel may be averaged with the other wheels of the vehicle to obtain a per-corner average input that is provided to a vehicle level controller. Any suitable method of combining information from multiple sensors may be employed to obtain overall information provided to a control module, including, but not limited to, summing, averaging or other matrix multiplication. According to some embodiments herein, a control methodology including a blend ratio may be implemented for controlling heave and/or pitch of a vehicle body. In some embodiments, an overall force command may be configured to modify the heave and/or pitch motion of the vehicle body, and the overall force command may be allocated to individual actuators to achieve the overall control objective. In other embodiments control methodologies described herein may be employed to control other vehicle motion parameters, such as vehicle body roll, as the present disclosure is not so limited.

In some embodiments, a vehicle may include a user interface through which the user may provide user input to affect the control of the vehicle. For example, a user interface may include a touch screen, buttons, switches, microphone (e.g., for receiving voice commands), etc. In some embodiments, the user interface may be configured to receive input from a user that may be employed to update one or more parameters for control of the vehicle. For example, in some embodiments, the user interface may be configured to receive user input. The blend ratio may then be determined at least in part using the user input as discussed herein. According to such an example, a user may provide input regarding an operating mode selection (e.g., comfort, sport, etc.). Based on the mode selection, the determination of the blend ratio may change. In a comfort mode, for example, the blend ratio determination may be set to favor more of an isolation control mode to increase vehicle body isolation. In a sport mode, for example, the blend ratio determination may be set to favor more of a tracking control mode to introduce increased motion to the vehicle body to more closely track variations in the road surface height to provide increased driving feedback, e.g., more of a sports car feel. In some cases, a formula for the blend ratio determination may be updated and/or one or more parameters in a formula for the blend ratio determination may be updated based on the received user input. In some embodiments, a formula for the blend ratio determination may be updated and/or one or more parameters in a formula for the blend ratio determination may be updated based on information from a user and/or an identification of a driver and/or occupants of a vehicle. For example, an occupant may be prone to motion sickness such that the formula is updated when the occupant is identified to favor a control strategy that avoids motions of the vehicle body associated with motion sickness. In some embodiments, a vehicle control system may determine an identity of a driver or occupant by detecting a credential (e.g., key, phone, RFID etc.) associated with a particular driver or occupant. In some embodiments, a driver or occupant may identify themselves (e.g., via user input at a graphical user interface). In some embodiments, a driver or occupant my be identified by detection of a biometric by a biometric sensor (e.g., facial recognition by camera, fingerprint by fingerprint sensor, etc.). Other methods of identifying a driver and/or occupant may also be implemented in some embodiments.

Alternatively or additionally, in some embodiments, a vehicle may include at least one forward-looking sensor. The at least one forward-looking sensor may be configured to obtain forward-looking information regarding upcoming road conditions, road events, or road features. In some embodiments, at least one forward-looking sensor may include one or more of a LIDAR sensor, camera, radar sensor, ultrasonic sensor, terrain-based navigation system and/or any other suitable forward-looking sensor. In some embodiments, a blend ratio may be determined based on forward-looking information obtained by a forward-looking sensor. For example, the forward-looking information may be indicative of a small road feature (e.g., bump or pothole) that can be fully compensated for by an isolation control module. According to this example, the blend ratio may be determined to favor the isolation control module. As an alternative example, the forward-looking information may be indicative of a large road feature (e.g., a hill) that cannot be fully compensated for by the isolation control module. According to this example, the blend ratio may be determined to incorporate additional output from a tracking control module into an overall output (e.g., force command). In this manner, forward-looking information may be optionally incorporated into the methodologies described herein to improve the amount of vehicle body isolation that may be provided while still adapting to changing road conditions that cannot be fully compensated for by an isolation control module.

According to exemplary embodiments herein, "skyhook" may refer to control seeking to isolate a vehicle body from external disturbances regardless of the profile of the underlying road surface. For example, under perfect or effectively perfect skyhook control a vehicle body may experience no accelerations or effectively no accelerations in roll, pitch, and/or heave. It should be understood that when skyhook control is implemented by an actual active suspension system, depending on the magnitude and frequency of a road input to a vehicle from a corresponding feature on a road surface, the active suspension system may only mitigate a portion of the road input such that the vehicle body is still subject to some force/acceleration due to the road input. However, this force/acceleration may be reduced as compared to situations in which the skyhook control is not applied.

According to exemplary embodiments herein, "groundhook" may refer to control seeking to maintain a fixed distance or an effectively fixed distance between a vehicle body and the underlying road surface. For example, the distance between a wheel and the vehicle body under perfect groundhook control may remain constant. It should be understood that when groundhook control is implemented by an actual active suspension system, depending on the magnitude and frequency of a road input to a vehicle from a corresponding feature on a road surface, the active suspension system may not maintain a constant distance between the vehicle body and road surface. Instead, some variations from the target distance may be experienced, though these variations from the target distance may be mitigated as compared to situations in which the groundhook control is not applied.

Variations of skyhook and groundhook may be implemented in some embodiments. For example, "stiff" may refer to the control module tending more toward the perfect form of its control goal, whereas "weak" may refer to the controller being weaker and tending more toward the other form of control. For example, a "stiff skyhook" controller may attempt to implement perfect skyhook control as much as possible for a given active suspension system (e.g., provide a maximum level of vehicle body isolation for the active suspension system). In some embodiments, "stiff skyhook" may implement skyhook control down to frequencies as low as 0.2 Hz. As an alternative example, a "weak skyhook" controller may implement some skyhook control but may also implement some groundhook control. In some embodiments, "weak skyhook" may implement skyhook control down to frequencies as low as 1 Hz with gains less than those of the "stiff skyhook" controller. In some embodiments a tracking control module may be a weak skyhook controller, implementing some groundhook control while retaining some isolation of the vehicle body. Skyhook and groundhook control and their variations may be implemented for at least partially controlling heave and/or pitch of the vehicle, in some embodiments. In some embodiments, skyhook and groundhook control may also at least partially control roll of the vehicle as well.

According to embodiments herein, a vehicle may include a vehicle body and one or more wheels (e.g., four wheels) supporting the vehicle body. The vehicle may include an active suspension system operatively interposed between the one or more wheels and the vehicle body. The active suspension system may be configured to adjust a normal force between any one or more of the wheels of the vehicle and the ground (e.g., via a tire) by applying force between the wheel and a chassis or body of the vehicle. The active suspension system may be configured to generate extension or compression of a suspension assembly main spring, in some embodiments. The forces applied between the wheels and the vehicle body may be transferred to the vehicle body through the active suspension system, allowing the active suspension system to control one or more motion parameters of the vehicle body. Vehicle motion parameters, may include, but are not limited to, rotations about various axes (e.g., roll and pitch). Vehicle motion parameters may also include, but are not limited to, translation along various axes (e.g., translation along a vertical z-axis otherwise referred to as "heave"). In some embodiments, three Cartesian principal axes may be established relative to a supporting surface underneath a vehicle (e.g., a plane). In some embodiments, the three cartesian principal axes may be established relative to a direction of local gravity when the vehicle is disposed on level ground. As discussed further below, the active suspension system may control one or more vehicle motion parameters of the vehicle body of the vehicle by applying active or passive forces between the vehicle body and one or more wheels. Changing the force output by the active suspension system may alter the one or more vehicle motion parameters. In some embodiments, a vehicle may include at least one processor configured to execute computer readable instructions stored in associated volatile or non-volatile memory that when executed perform any of the methods disclosed herein. In some embodiments, the at least one processor may be configured to control the active suspension system to control the one or more vehicle motion parameters of the vehicle body. In some embodiments, the at least one processor may be operated as a part of one or more control modules of the vehicle.

In some embodiments, an active suspension system is operatively interposed between one or more wheels and a vehicle body of a vehicle. The active suspension system may include one or more actuators associated with the one or more wheels. For example, the active suspension system may include at least one actuator at each wheel of the vehicle. In some embodiments, an actuator of an active suspension system comprises a hydraulic device operatively coupled with an electric motor/generator. The term hydraulic device may refer to either a hydraulic motor, a hydraulic pump, a hydraulic motor being operated as a pump, and/or a hydraulic pump being operated as a hydraulic motor. A hydraulic device may be capable of providing fixed displacements, variable displacements, fixed velocities, and/or variable velocities as the disclosure is not limited to any particular device. Appropriate types of hydraulic devices may include, but are not limited to, gerotor pumps, vane pumps, gear pumps, screw pumps, and/or any other appropriate type of hydraulic device. The term electric motor/generator may refer to either an electric motor and/or an electric generator. In either case, in some embodiments, an associated hydraulic device may drive the electric motor/ generator such that it functions as a generator to provide damping to a hydraulic actuator while also generating electrical energy in at least one mode of operation. The electric motor/generator may also drive the hydraulic device as a pump to create a flow of fluid to drive operation of the actuator and/or resist movement of a piston of the actuator in at least one mode of operation. Depending on the particular embodiment, an electric motor/generator may be operated only as a generator, only as a driven motor, and/or as both depending on the particular application. Appropriate types of electric motor/generators may include, but are not limited to, a brushless DC motor, a brushed DC motor, an induction motor, a dynamo, or any other type of device capable of converting electricity into rotary motion and/or vice-versa. The actuator may be configured to apply active forces and/or passive forces (which may also be referred to as damping forces herein) between a wheel of the vehicle and the chassis or body of the vehicle. The application of active and/or passive forces may be employed to control a motion of the vehicle body and/or wheel. In some embodiments, an active suspension system may include one or more physical springs or dampers, which may apply passive forces to the one or more wheels and the chassis or the body of the vehicle.

While an actuator of an active suspension system disclosed above is described as including a hydraulic device and an electric motor/generator, the current disclosure is not limited to any particular type of active suspension system. Accordingly, other appropriate types of active suspension systems including different types of actuators may also be used. For example, electrical actuators such as solenoid-based actuators, actuators using linear electric motors, hydraulic actuators associated with a central pressure source (e.g., a pump) and associated valves, and/or any other appropriate type of actuator capable of being used to operate an active suspension system may be used with the various embodiments disclosed herein as the disclosure is not so limited.

As used herein an “active force” is a force that is generated by a vehicle suspension system, and that is oriented at least partially in the direction of motion at the point of application of the force on an associated structure. For example, an active force may include applying force to a wheel in a direction of motion of the wheel via an active suspension system actuator. As used herein a “passive force”, “damping force”, or other similar term may be a force that may be applied on a structure in a direction that at least partially opposes the motion at the point of application of the force. For example, a suspension system actuator may generate a damping force (e.g., forces that resist movement of a wheel and/or vehicle body) in response to a wheel being moved by a road feature, though it is noted that an active suspension system may also apply damping forces that resist motion of an associated mass. For example, in some embodiments an actuator may apply a damping force in a direction that is at least partially opposite a direction of motion of the component being damped. According to exemplary embodiments described herein, certain vehicle systems (e.g., active suspension systems) may apply active and/or passive forces depending on a mode of operation of the vehicle system. For example, an active suspension system may be operated in a first mode where an actuator is employed to apply active forces to one or more portions of the vehicle (e.g., a vehicle body and wheel of the vehicle) and in a second mode where only passive forces are applied in response to external force inputs on the vehicle. In some operational modes, vehicle systems, including active suspension systems, may generate both active and passive forces.

As used herein, a “road event” is any event that may occur while a vehicle is traveling on a roadway. In some embodiments, a road event may include encountering a road feature. A “road feature” is any non-nominal road condition that may be encountered by a vehicle while traveling on a road surface. For example, a road feature may include, but is not limited to rough pavement, potholes, manhole covers, storm drains, bumps, uneven lanes, variable road materials (e.g., dirt, gravel, pavement, concrete, metal, etc.), road coverings (e.g., snow, ice, salt, sand, dirt, water, etc.), and/or any other appropriate feature that may involve changes in the forces applied to a vehicle traversing a road surface. In some embodiments, a road event may include a turn (e.g., traversing a corner). In some embodiments, a road event may include a braking event. A braking event is any instance or period of time in which one or more brakes of a vehicle are applied, e.g., to decelerate or stop the vehicle or the vehicle is decelerated by applying a drag to one or more rotating components in the drive. A braking event may have any duration, as the present disclosure is not so limited. In some embodiments, a braking event may include a single application of the brakes or multiple applications of the brakes, as the present disclosure is not so limited.

According to exemplary embodiments described herein, a vehicle control system, control module, or other appropriate system may be operated by one or more processors. The one or more processors may be configured to execute computer readable instructions stored in volatile or non-volatile memory. The one or more processors may communicate with one or more actuators associated with various systems of the vehicle (e.g., braking system, active suspension system, steering system, rear steering system, driver assistance system, etc.) to control activation and movement of the various systems of the vehicle. The one or more processors may receive information from one or more sensors that provide feedback regarding the various systems of the vehicle. For example, the one or more processors may receive position information regarding the vehicle from a Global Navigation Satellite System (GNSS) or other positioning system. The sensors on board the vehicle may include, but are not limited to, wheel rotation speed sensors, accelerometers, inertial measurement units (IMUs), optical sensors (e.g., cameras, LIDAR), radar, suspension position sensors, gyroscopes, and/or any other appropriate type of sensor. In this manner, the vehicle control system may implement proportional control, integral control, derivative control, a combination thereof (e.g., PID control), or other control strategies of various systems of the vehicle. Other feedback or feedforward control schemes are also contemplated, and the present disclosure is not limited in this regard. Any suitable sensors in any desirable quantities may be employed to provide feedback information to the one or more processors. Information from sensors may be employed in coordination with desirable processing techniques (e.g., machine vision). The one or more processors may also communicate with other controllers, computers, and/or processors on a local area network, a controller area network (CAN), wide area network, a cloud-based database, or internet using an appropriate wireless or wired communication protocol. It should be noted that while exemplary embodiments described herein are described with reference to a single processor, any suitable number of processors may be employed as a part of a vehicle, as the present disclosure is not so limited.

It should be understood that as used herein a vehicle body may refer to any appropriate type of vehicle body construction including but not limited to: unitary, unibody, or monocoque vehicle body constructions; vehicle bodies including a separately formed vehicle chassis attached to the other potions of the vehicle body; and/or any other appropriate type of vehicle body construction that functions as a sprung mass attached to a suspension system of a vehicle. Additionally, it should be understood that references to a vehicle body disclosed herein may be replaced with a vehicle chassis and that, where context allows, references to operating parameters and physical characteristics of the vehicle body and vehicle chassis may be used interchangeably with one another in any of the embodiments disclosed herein as the disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic of one embodiment of a vehicle 100. The vehicle includes a vehicle body 102 that supports the various components of the vehicle. The vehicle 100 includes a first wheel 106A and a second wheel 106B operatively coupled to the vehicle body 102. The first wheel 106A and the second wheel 106B may be coupled to a propulsion system (e.g., internal combustion engine, electric motor, etc.). The vehicle body 102 may be representative of a sprung mass of the vehicle sprung from the first wheel 106A and the second wheel 106B. The first wheel 106A and the second wheel 106B may be two of the unsprung masses of the vehicle. While two wheels are shown in the embodiment of FIG. 1, in some embodiments a vehicle may include two, three, four, five, six, or any other number of wheels, as the present disclosure is not so limited. The vehicle of FIG. 1 has a center of mass 104 which may be representative of a center point about which the vehicle body 102 may rotate (e.g., in pitch, roll, and yaw).

As shown in FIG. 1, the vehicle 100 includes a vehicle control system 200 that may communicate with various subsystems via a communication system 201. As shown in FIG. 1, the vehicle 100 includes an active suspension system 107 that is operatively interposed between the first wheel 106A and second wheel 106B (e.g., unsprung mass) of the vehicle and the vehicle body 102 (e.g., sprung mass). In some embodiments, the first wheel 106A and the second wheel 106B may be representative of wheel assemblies. For example, in some cases, an active suspension system 107 may be coupled to a wheel assembly or other intermediate component, rather than directly to a wheel. As shown in FIG. 1, the active suspension system 107 includes one or more active suspension actuators 108A, 108B that may be operatively interposed between each wheel 106A, 106B of the vehicle and the vehicle body, such that separate actuators of the active suspension may independently control the motion of separate wheels of the vehicle. In the embodiment of FIG. 1, a first actuator 108A is coupled to the first wheel 106A, and a second actuator 108B is coupled to the second wheel 106B. The actuators 108A, 108B may be configured to apply force between the wheels 106A, 106B and the vehicle body 102 to adjust a normal component of force between the wheels and a road surface 300 by applying an intervening active extension or compression force between the wheels or wheel assemblies and the vehicle body. Such an application of force by the actuators 108A, 108B may affect a motion response of the vehicle body 102, and in particular one or more vehicle motion parameters.

As shown in the embodiment of FIG. 1, the vehicle 100 may also include a braking system including a first brake 110A and a second brake 110B. The first brake 110A may be coupled to the first wheel 106A and the second brake 110B may be coupled to the second wheel 106B. In the embodiment of FIG. 1, the braking system includes independent brakes coupled to each of the vehicle wheels 106A, 106B, such that a braking force may be applied to each wheel independently.

As shown in FIG. 1, the vehicle may traverse over a road surface 300. The road surface 300 may include one or more road features 302. The road features 302 may cause fluctuations in the normal load on a wheel 106A and/or 106B of the vehicle 100 as the wheels traverse over and past the road features (e.g., by accelerating the wheel upward and/or downward). In some embodiments, a road feature 302 may produce a vehicle body motion response of the vehicle based on one or more vehicle motion parameters of the vehicle body 102. For example, a road feature 302 may introduce a roll motion, pitch motion, heave motion, or torsional motion in the vehicle body 102 that may be perceptible by a user of the vehicle 100. The vehicle control system 200 may control the active suspension system 107 and the force applied by each of the actuators 108A, 108B to provide a desired vehicle motion response as characterized by one or more vehicle motion parameters (e.g., heave, pitch, roll, etc.). As discussed further below, force commands may be allocated to the different actuators 108A, 108B of the active suspension system 107 to provide a desired level of isolation of the vehicle body 102 from the disturbances to improve user comfort and/or to appropriately track the road surface.

According to the embodiment of FIG. 1, the vehicle wheels 106A, 106B may have a range of motion 112A, 112B relative to the vehicle body 102 provided by the active suspension system 107. That is, the wheels 106A, 106B may be able to move a certain distance to compensate for or mitigate effects of disturbances caused by road features 302. At the end of the range of motion 112A, 112B, the suspension system may reach an end-stop of the vehicle body 102 which stops further movement of the wheel in its current direction of motion. Contact with the end-stop may be undesirable in most circumstances, as force and resulting vibration may be transmitted directly between the wheels 106A, 106B, and the vehicle body 102 without mitigation by the active suspension system 107. In some embodiments, the end-stops may have some shock absorption, but this absorption may be limited. Accordingly, as discussed previously, the inventors have recognized the benefits of an active suspension system 107 that may utilize the range of motion 112A, 112B of the wheels 106A, 106B to provide vehicle body 102 isolation while avoiding end of wheel travel events that may disturb a vehicle occupant. Such exemplary active suspension systems and related methods are discussed further below. In some other embodiments, the range of motions 112A, 112B may not be a physical range of motion, but rather a range of motion enforced by limits set by the vehicle control system 200.

It should be noted that the vehicle of FIG. 1 is simplified for the sake of explanation. A vehicle 100 may include any number of systems affecting the dynamics of the vehicle and its response to disturbances from road features 302. For example, user input devices such as steering, throttle, and braking may affect the response of a vehicle based on the user input. The vehicle control system may include at least one processor configured to execute computer readable instructions and control one or more vehicle outputs. For example, the vehicle control system 200 may include at least one processor configured to receive input from the user and command one or more systems of the vehicle to perform certain actions (e.g., acceleration, deceleration, steering). In some embodiments, the vehicle control system 200 may include an electronic stability control system and anti-lock braking system (ABS). The electronic stability control system may be configured to automatically apply the brakes 110A, 110B to help steer the vehicle where the driver intends to go when there is a loss of traction. The ABS is configured to inhibit wheels from locking up and sliding. The vehicle control system 200 may receive a plurality of inputs from a variety of sources, including, but not limited to, user input, sensors attached to a sprung mass of the vehicle, sensors attached to an unsprung mass of a vehicle, feedback from one or more actuators, data from local or remote databases, or any combination of the foregoing. The vehicle control system 200 may employ the plurality of inputs to determine one or more outputs (e.g., force commands) to one or more systems of a vehicle (e.g., active suspension system 107, brakes 110A, 110B, throttle, etc.) to achieve a desired vehicle response. Exemplary operational modes and control schemes for the vehicle control system 200 are discussed further below.

In some embodiments as shown in FIG. 1, the vehicle 100 may include a real-time communication system 201 that enables communication between the various subsystems and vehicle outputs. The communication system 201 may employ any appropriate connection protocol including, for example, a controller area network (CAN), a local interconnect network (LIN), a vehicle area network (VAN), FlexRay, D2B, Ethernet, a direct communication link (such as wires and optical fibers), or a wireless communication link. The communications system may be employed to share information between subsystems, like ABS or ESC, while receiving vehicle state parameters or other information from these same or other systems. Information that may be shared between subsystems and employed for vehicle output control includes, but is not limited to, for example, vehicle yaw and yaw rate, vehicle velocity, vehicle acceleration, vehicle lateral acceleration, steering wheel position, steering wheel torque, if the brakes are being applied, suspension spring compression or extension, vehicle body heave velocity, and wheel heave velocity (e.g., suspension velocity). The vehicle control system 200 may control the active suspension system 107 based on information from the vehicle such as the state of one or more vehicle subsystems, such as ABS and ESC, which engage during unusual events. For example, the system may provide different control of the wheels and vehicle if one or more systems are engaged.

In some embodiments an active suspension system 107 may sense several parameters relating to the road, wheel, vehicle body movement, and other parameters that may benefit other vehicle subsystems. Such information may be transmitted from the active suspension system to the vehicle control system 200 and the other subsystems via the communication system 201. Other vehicle subsystems may alter their control based on information from the active suspension system. As such, bidirectional information may be communicated between the active suspension system 107 and other subsystems, and control of both the active suspension system and the other vehicle systems may be provided based at least partially on this information transfer. In some embodiments, the communication system 201 may include a transceiver configured to send or receive information. In some embodiments, the transceiver may be configured to receive the reference road information from another vehicle or cloud service (e.g., one or more servers). The transceiver may be configured to communicate wirelessly via any suitable wireless protocol, as the present disclosure is not so limited.

In some embodiments, the vehicle control system 200 may include a forward-looking sensor 116. The forward-looking sensor may sense road characteristics, road features, or objects in front the vehicle 100, which may be provided to the vehicle control system (e.g., at least one processor of the vehicle control system) as forward-looking road information. In some embodiments, the forward-looking sensor 116 may include one or more of a LIDAR sensor, camera, radar sensor, ultrasonic sensor, or any other suitable forward-looking sensor. In some embodiments, the forward-looking information obtained by the forward-looking sensor may be provided to a processor to be used in control of the vehicle (e.g., determination of a blend ratio). In the embodiment of FIG. 1, the vehicle control system may also include reference road information that may be stored in memory onboard the vehicle. In some embodiments, forward-looking information may be employed in control of the vehicle 100, for example, to reduce or eliminate undesirable motion of the vehicle body 102.

In some embodiments, a vehicle may include a user interface 118 through which the user may provide user input to affect the control of the vehicle. In the embodiment of FIG. 1, the user interface 118 may include a touch screen of an infotainment unit. In other embodiments, a user interface may include a touch screen, steering wheel, buttons, switches, microphone (e.g., for voice commands), pedals, or any other suitable input device. The user interface 118 may be configured to receive input from a user that may be employed to update one or more parameters for control of the various subsystems of the vehicle, including the active suspension system. In some embodiments, a user may provide user input at the user interface 118 to select an operating mode (e.g., comfort, sport, etc.). Based on the mode selected, various control parameters of the vehicle may change, including, but not limited to, engine tuning, throttle response, braking response, steering response, and suspension control. For example, the user input may be employed to update parameters affecting the determination of forces to be applied by the actuators 108A, 108B of the active suspension system 107.

In some embodiments, the vehicle control system 200 is configured to control the various vehicle subsystems including the active suspension system 107. In particular, as will be discussed further below with reference to FIGS. 2-4, the vehicle control system may be configured to determine a force command for the actuators 108A, 108B of the active suspension system to control vehicle motion parameters of the vehicle body 102. For example, the vehicle control system 200 may command the actuators 108A, 108B to generate forces and/or movements of the wheels 106A, 106B to achieve a desired motion or isolation of the vehicle body 102 that will be perceptible to an occupant of the vehicle. In one operating mode, the vehicle control system 200 commands the actuators 108A, 108B to isolate the vehicle body from accelerations caused by external disturbances (e.g., caused by road features 302). In such an operating mode, the wheels 106A, 106B may move relative to the vehicle body 102 within their respective ranges of motion 112A, 112B to at least partially compensate for the forces caused by the road features 302 or due to inertial forces induced by the acceleration of the vehicle. In some embodiments, the vehicle control system 200 may include one or more controllers that may contribute to an overall force command used to command the actuators 108A, 108B. Exemplary individual controllers and their effect on the control of the motion parameters of the vehicle body 102 are discussed further with reference to FIGS. 2-3. A combination or blend of multiple controller outputs and that combination's effect on the control of the motion parameters of the vehicle body is discussed further with reference to FIG. 4.

Figure 2:
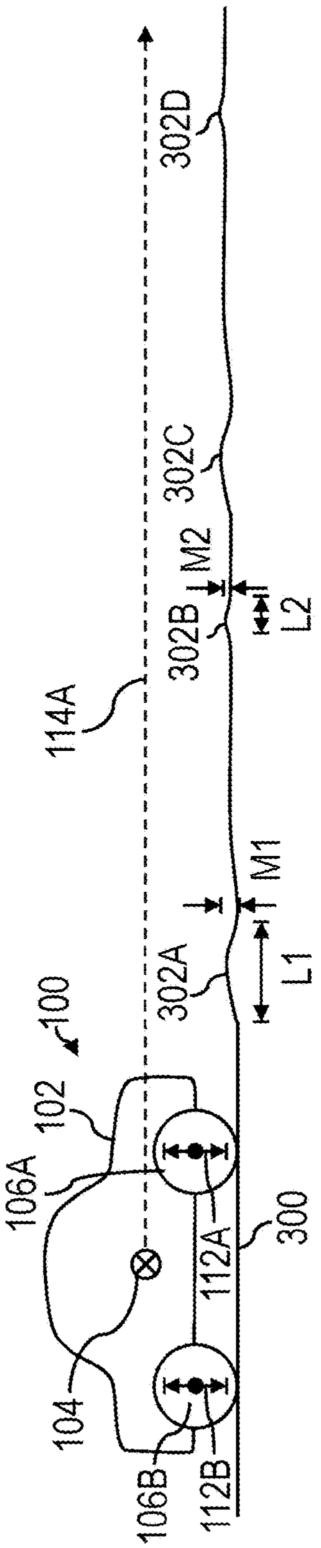
FIG. 2 is a schematic of an embodiment of a vehicle under vehicle body isolation control.

FIG. 2 is a schematic of an embodiment of a vehicle 100 under vehicle body isolation control. In the embodiment of FIG. 2, a vehicle control system has implemented an isolation control module that may seek to achieve stiff skyhook control. That is, the vehicle control system seeks to avoid, minimize, or effectively eliminate accelerations of the vehicle body 102 for one or more motion parameters (e.g., pitch, roll, and/or heave). For example, in a vertical heave direction, the vehicle control system, in certain modes, may seek to maintain a center of mass 104 of the vehicle within a horizontal plane as the vehicle travels along a road surface. As illustrated in FIG. 2, an isolation control line 114A is representative of the goal of the vehicle control system in controlling the heave motion parameter of the vehicle body 102 as the vehicle moves along the road surface 300. The isolation control line 114A is horizontal relative to the page, such that the vehicle body 102 does not move up or down (e.g., in a heave direction) in response to road features. The isolation control line 114A may be representative of the heave motion parameters of the vehicle body, though the vehicle control system may also control other motion parameters similarly. For example, the vehicle body pitch (e.g., rotation clockwise or counterclockwise about the center of mass 104 relative to the page) may also have a goal of being held constant, effectively constant, or substantially constant under stiff skyhook control.

As shown in FIG. 2, the vehicle includes a first wheel 106A and a second wheel 106B that support the vehicle body 102 (and other sprung mass) on the road surface 300. The first wheel 106A and the second wheel 106B may be coupled to the vehicle body 102 via an active suspension system (for example, see FIG. 1). The first wheel 106A may be movable relative to the vehicle body 102 in a first range of motion 112A. The position of the first wheel 106A within the first range of motion 112A may be controlled by, e.g., passive and active components, including actuators and springs. In particular, the first wheel 106A may be controlled via an actuator of the active suspension system that may apply forces to the first wheel 106A to achieve a desired position of the first wheel relative to the vehicle body 102. The actuator may apply forces between the vehicle body 102 and the first wheel 106A to obtain the desired position and also impart forces to the vehicle body to control the motion of the vehicle body. Similarly, the second wheel 106B may be movable relative to the vehicle body 102 in a second range of motion 112B. The position of the second wheel 106B within the second range of motion 112B may be controlled by passive and active components, including actuators, and springs. In particular, the second wheel 106B may be controlled via an actuator of the active suspension system that may apply forces to the second wheel 106B to achieve a desired position of the second wheel relative to the vehicle body 102. The actuator may apply forces between the vehicle body 102 and the second wheel 106B to obtain the desired position and also impart forces to the vehicle body to control the motion of the vehicle body.

According to the example of FIG. 2, the road surface 300 includes a plurality of road features 302A, 302B, 302C, 302D. These road features are representative of bumps or variations in an otherwise smooth, effectively smooth, or nominal road surface that will impart forces to the vehicle 100 when contacted by the first wheel 106A and the second wheel 106B. In conventional vehicle suspensions, springs and dampers would soften or delay force transmission to the vehicle body 102. However, a fully passive suspension will transfer some force to the vehicle body 102, resulting in a deviation of the center of mass 104 from the idealized isolation control line 114A. In active suspension systems, active forces countering the forces imparted to the wheel by the road features 302A, 302B, 302C, 302D may reduce or eliminate forces imparted to the vehicle body 102 that would cause a deviation from the idealized isolation control line 114A. For example, rather than maintaining a fixed distance between the first wheel 106A and the vehicle body 102 when the first wheel encounters the first road feature, the active suspension system may reduce the distance between the first wheel and the vehicle body (e.g., move the wheel upward) to compensate for the increased elevation of the first road feature. However, as discussed previously, the ability of the active suspension system to compensate for road features is at least partially dependent on the range of motion of the wheels of the vehicle and the magnitude and length of the particular road feature. For example, a road feature having a magnitude less than a range of motion of the wheel may be compensated for by the active suspension system, whereas a road feature having a magnitude greater than a range of motion of the wheel may not be compensated for by an active suspension. In addition, such a road feature may cause an end of travel event (e.g., collision with an end stop). As an alternate example, a road feature having a length less than a threshold length, and correspondingly a threshold duration while being traversed, may be compensated for by an active suspension without compromising the ability of the suspension to compensate for future road features, whereas a road feature having a length greater than the threshold length or duration may be compensated for (depending on the magnitude as described previously), but may compromise the ability of the active suspension system to compensate for future road features or may otherwise affect the dynamics of the vehicle. The length of a road feature may also correspond to a frequency of the forces applied to the vehicle. For example, a hill may result in a lower frequency force applied force compared to the higher frequency force of a pothole (at the same forward speed) and may be compensated for differently by a vehicle control system and active suspension system as disclosed herein.

As shown in FIG. 2, the road surface 300 includes four road features 302A, 302B, 302C, 302D. The first road feature 302A has a first magnitude M1 and a first length L1. In some embodiments, the magnitude of a road feature may be measured in vertical displacement from the mean road surface (e.g., horizontal). In the example of FIG. 2, the first magnitude M1 is less than the first range of motion 112A and the second range of motion 112B of the first wheel 106A and the second wheel 106B, respectively. Accordingly, the vehicle control system of the vehicle 100 may be able to compensate for the effect of the first road features 302A on the vehicle body and substantially maintain the isolation control line 114A. The first length L1 is also less than a threshold length or duration that may be indicative of a momentary road feature such as a bump, crack, pothole, etc. as compared to a larger road feature like a hill. Accordingly, the active suspension system of the vehicle may be able to control the suspension as the vehicle traverse the road feature to maintain the isolation control line 114A and return the wheels 106A, 106B to their original position once the first road feature is cleared. Similar to the first road feature 302A, the second road feature 302B has a second magnitude M2 that is less than range of motions 112A, 112B of the wheels 106A, 106B. A second length L2 of the of the second road feature is also less than the threshold length or duration. The third road feature 302C has the same magnitude and length as the first road feature 302A. The fourth road feature 302D has the same magnitude and length as the first road feature 302A. Accordingly, the vehicle 100 may traverse the plurality of road features while maintaining or substantially maintaining the isolation control line 114A while avoiding end of travel events. Thus, in circumstances such as FIG. 2, an isolation control implementing stiff skyhook control may be possible or appropriate to fully isolate the vehicle body 102 from external disturbances, or at least as much as may be physically isolated using the active suspension system.

Figure 3:
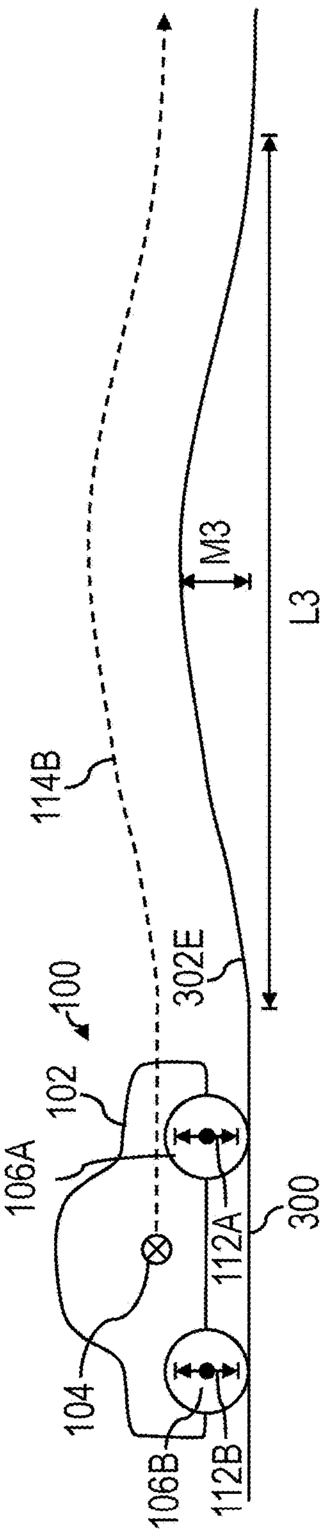
FIG. 3 is a schematic of an embodiment of a vehicle under road tracking control.

FIG. 3 is a schematic of an embodiment of a vehicle 100 under road tracking control and represents a different scenario than that of FIG. 2. In the scenario of FIG. 3, the road surface 300 includes a fifth road feature 302E. The fifth road feature 302E may be representative of a hill or other large road feature. The fifth road feature includes a third magnitude M3 that is larger than the range of motion 112A, 112B of the first wheel 106A and/or the second wheel 106B, respectively. Accordingly, the isolation control shown and described with reference to FIG. 2 may not work in the scenario of FIG. 3, as the first wheel 106A and the second wheel 106B may reach end of travel (e.g., and contact an end stop) when attempting to compensate for the fifth road feature 302E. As shown in FIG. 3, the fifth road feature 302E also includes a third length L3, which is greater than the threshold length or duration. Accordingly, the forces generated by vehicle interaction with the fifth road feature may be lower frequency than those of FIG. 2. In some embodiments, the threshold length may be a length which is traversed by the vehicle over a threshold length of time greater than approximately 1 second (e.g., frequencies less than 1 Hz). However, other durations and/or frequencies less than or greater than this range are also envisioned as the disclosure is not so limited.

In the embodiment of FIG. 3, the vehicle 100 may employ a tracking control module which implements stiff groundhook control. In stiff groundhook control, the center of mass 104 of the vehicle may be controlled to maintain at a fixed distance between a vehicle body of the vehicle and the road surface 300 at least as much as may be physically imposed by the active suspension system. In this manner, the forces generated by external disturbances like the fifth road feature 302E may be transferred to the vehicle body 102 via the first wheel 106A and the second wheel 106B. An exemplary tracking control line 114B is shown in FIG. 3, showing the path of the center of mass 104 as the vehicle traverses the road surface 300. As shown in FIG. 3, the tracking control line 114B mirrors the profile of the fifth road feature 302E. Under the tracking control of FIG. 3, the first wheel 106A may remain in a center point (or other predetermined point) of its range of motion 112A. Likewise, the second wheel 106B may remain in a center point (or other predetermined point) of its range of motion 112B. Accordingly, the first wheel 106A and the second wheel 106B may avoid contact with end stops under tracking control as shown in FIG. 3. It should be noted that FIG. 3 demonstrates stiff groundhook control for the sake of explanation. In other embodiments, a vehicle may not implement stiff groundhook control as the force transmission from the road surface 300 to the vehicle body 102 may be undesirable. In such other embodiments, weak groundhook may be employed, but with some compensation for disturbances (e.g., by allowing wheel travel to at least partially absorb the disturbances).

As discussed previously, the inventors have recognized the benefits of a vehicle control system that dynamically blends the isolation control shown in FIG. 2 with tracking control like that shown in FIG. 3. Such a vehicle control system may be able to employ the isolation control, as illustrated in FIG. 2, to at least partially, or completely, isolate the vehicle body from road features having a magnitude and/or length less than a predetermined threshold (e.g., a range of motion of a wheel, or a threshold length or duration). However, where a road feature like the fifth road feature 302E of FIG. 3 is encountered, the vehicle control system may be able to avoid end of travel events if the isolation control module may not be used exclusively for all circumstances. The results of such an exemplary blending process are illustrated in FIG. 4.

Figure 4:
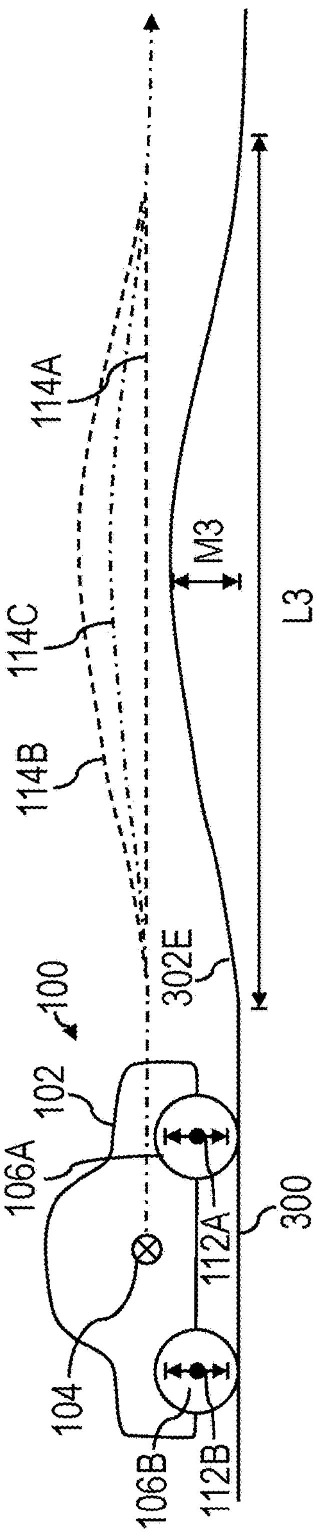
FIG. 4 is a schematic of an embodiment of a vehicle under a blended vehicle body isolation and road tracking control.

FIG. 4 is a schematic of an embodiment of a vehicle 100 under a blended vehicle body isolation and road tracking control. As shown in FIG. 4, the scenario is similar to that of FIG. 3. That is, the road surface 300 includes the fifth road feature 302E with a third magnitude M3 and the third length L3. The magnitude M3 exceeds the range of motion 112A, 112B of the wheels 106A and 106B, respectively. The two prior control strategies are also shown in FIG. 4 for comparison purposes. An isolation control line 114A is shown, which would result in the wheels 106A, 106B reaching end of travel and causing an abrupt disturbance to the vehicle body 102 and preventing the vehicle from following the desired path. A tracking control line 114B is also shown, which would not reduce the disturbance caused by the third road feature but would avoid end of travel events of the wheels. In some embodiments, the vehicle of FIG. 4 may implement a blended vehicle body isolation and road tracking control demonstrated by blend control line 114C. In some embodiments, a vehicle control system may separately determine outputs (e.g., force commands) for the isolation control strategy of FIG. 2 and the tracking control strategy of FIG. 3 (e.g., using corresponding control modules). The vehicle control system may then apply a blend ratio to determine the contribution of each of the control strategies into an overall output (e.g., force command) used to control an active suspension of the vehicle. The blend ratio may vary based on the output of the isolation control module, such that a larger output of the isolation control module results in a greater contribution from the tracking control module in the blended output. In this manner, the effect of road features like the fifth road feature 302E may be mitigated with some isolation control and without causing an end of travel event. Exemplary embodiments of such a vehicle control system and related methods are discussed further with reference to FIGS. 5-7.

Figure 5:
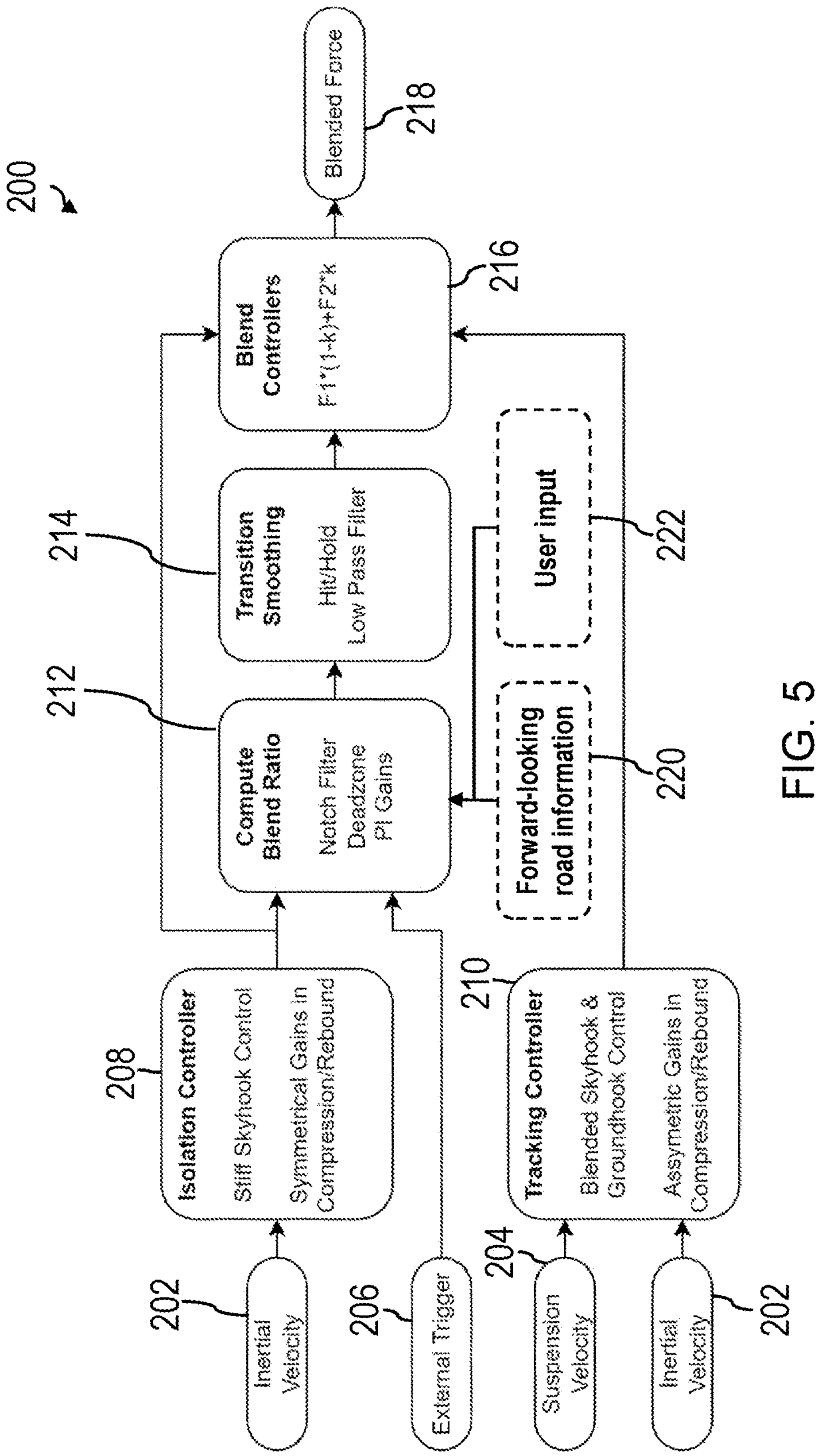
FIG. 5 is a block diagram of one embodiment of a vehicle control system.

FIG. 5 is a block diagram of one exemplary embodiment of a vehicle control system 200. In the embodiment of FIG. 5, the vehicle control system 200 may be configured to control an active suspension system of a vehicle, to modify and/or control one or more motion parameters of a vehicle body. As shown in FIG. 5, the vehicle control system includes an isolation control module 208 and a tracking control module 210. The isolation control module may be configured to implement stiff skyhook control (e.g., see FIG. 2), or other skyhook control that provides an increased amount of vehicle body isolation as compared to other control strategies implemented by the vehicle control system. In some embodiments, the isolation control module 208 may have, for example, symmetrical gains in the suspension compression and rebound suitable for vehicle body isolation. In the embodiment of FIG. 5, an inertial vehicle body velocity 202 (e.g., a vehicle body parameter) is an input, and in some embodiments the sole input, to the isolation control module 208. The inertial velocity may be measured by one or more accelerometers disposed on a vehicle body, in some embodiments. In other embodiments, other vehicle body information such as vehicle body parameters may be input to the isolation control module, as the present disclosure is not so limited. The tracking control module 210 may implement blended skyhook and groundhook control in some embodiments (e.g., weak skyhook or weak groundhook) such that the tracking control module may provide a decreased amount of vehicle body isolation as compared to the skyhook control implemented by the isolation control module. In some embodiments, the tracking control module 210 may have asymmetrical gains in compression and rebound of the suspension system. For example, in some embodiments, the tracking control module 210 may provide greater damping in rebound compared to compression. In the embodiment of FIG. 5, the tracking control module 210 has suspension velocity 204 (e.g., a suspension parameter) and inertial velocity 202 (e.g., a vehicle body parameter) as inputs. In some embodiments, the suspension velocity may be provided by one or more sensors of an active suspension system and/or as feedback from an active suspension system actuator. In other embodiments, any appropriate combination of vehicle body information and suspension information may be employed as input to the tracking control module. Both the isolation control module 208 and the tracking control module 210 may produce an output based on their respective inputs. Each of these outputs may be an overall force command to control motion of a vehicle body. These outputs may be determined independently from one another based on the control goals of the different controllers. As discussed below, these independent outputs may be ultimately used to determine a blended force 218 output. It should be noted that the process described below with reference to exemplary FIG. 5 may occur repeatedly and in real time, in some embodiments.

The output of the isolation control module 208 may be employed by the vehicle control system 200 to determine a blend ratio in block 212. In some embodiments, a blend ratio may be a value between 0 and 1, where the value represents a relative contribution of the tracking control module 210 to an overall blended output. As shown in block 216, an overall blended force 218 may be determined according to the formula $F1*(1-k)+F2*k$, where k is the blend ratio, F1 is the output of the isolation control module 208, and F2 is the output of the tracking control module 210. For example, a blend ratio of 0 may represent full control by the isolation control module 208 (e.g., 100% of the blended force output is contributed by the output of the isolation control module). Alternatively, a blend ratio of 1 may represent full control by the tracking control module 210 (e.g., 100% of the blended force output is contributed by the output of the tracking control module). In some embodiments, the blend ratio may be represented as an antecedent and a consequent. In such an embodiment, the antecedent may be between 0 and 1, and the consequent may be between 0 and 1, where the antecedent and consequent sum to 1. The antecedent of the blend ratio may be proportional to a contribution of the isolation control module 208 (or another controller in other embodiments). The consequent may be proportional to a contribution of the tracking control module 210 (or another controller in other embodiments). For example, the blend ratio may be represented as an antecedent of 0.25 and a consequent of 0.75. In such an example, the isolation control module 208 may contribute 25% of an overall blended output, and the tracking control module 210 may contribute 75% of an overall blended output. A blend ratio may be represented as any appropriate value or relationship that may be applied to determine a combined overall output, as the present disclosure is not so limited.

According to some embodiments as shown in FIG. 5, the blend ratio may be determined by the vehicle control system based solely on the output from the isolation control module 208. The inventors have recognized that the isolation control module output may be highly correlated with suspension travel and may provide a cleaner signal less prone to sensor noise as compared to determining the blend ratio on direct sensor input. Notably, in the exemplary embodiment of FIG. 5, the blend ratio is not determined based on the output of the tracking control module. Thus, the blend ratio may be a function of the isolation control module output and determined automatically based on the instantaneous output of the isolation control module, though instances in which the blend ratio is determined based on an output of the isolation control module over a time period are also contemplated. In some embodiments, the blend ratio may be proportional to the isolation control module output. For example, the blend ratio may be proportional to a force command output by the isolation control module. In some embodiments, when a requested isolation force command output exceeds 80% of a maximum actuator capacity, a proportional action may move the blend ratio toward a tracking force command output. In some such embodiments, if the isolation force command output is less than 80% of a maximum actuator capacity, the blend ratio may favor the isolation force command output and may be constant or otherwise non-proportional to the isolation force command output. The proportionality of the blend ratio to the isolation control module output may allow the blend ratio to be sensitive to large increases in isolation control module output that may otherwise generate an end of travel event. In some embodiments, the blend ratio may relate to an integral of the isolation control module output, which may assist with modifying the blend ratio when prolonged forces are applied (e.g., greater than a threshold length or duration). In some embodiments, other tuning parameters may be employed to determine a blend ratio based on the output from the isolation control module. For example, in some embodiments a notch filter may be employed to remove energy in the force command at chosen frequency, reducing trigger sensitivity. As an example, a filter placed at 1-3 Hz can create a bias to an isolation mode where the vehicle displays a natural frequency resonance. As another example, a dead zone parameter may be employed to allow an integrator to ignore a portion of the force output to avoid increasing the blend ratio for lower force outputs with forces less than or equal to 50% of the actuator capacity. In other embodiments any suitable parameters may be employed to transform an isolation control module output into a blend ratio, as the present disclosure is not so limited. In some embodiments, optional information including user input and forward-looking information may be employed to determine a blend ratio. In some embodiments, an external trigger 206 may cause the vehicle control system to modify one or more parameters of the blend ratio determination of block 212.

In some embodiments as shown in FIG. 5, optionally forward-looking road information 220 may contribute to the determination of the blend ratio in block 212 based on the output of the isolation control module 208. The forward-looking road information may be obtained received from one or more forward-looking sensors (e.g., LIDAR, camera, etc.) or from one or more on-board or remote databases N. In some embodiments, the forward-looking information may be employed to tune one or more parameters of the blend ratio determination (e.g., coefficients for proportional and integral components of the determination). In some embodiments, the forward-looking road information may be employed to establish a floor or ceiling for a blend ratio. A floor may be a threshold blend ratio which the blend ratio is greater than or equal to. A ceiling may be a threshold blend ratio which the blend ratio is less than or equal to. In some such embodiments, the forward-looking information may be indicative of a small road feature (e.g., bump or pothole or other road feature that is smaller than a threshold size, length, and/or time duration during traversing) that can be fully compensated for by an isolation control module. In some embodiments, a ceiling may be applied to the blend ratio such that the output from the isolation control module 208 may correspond to a majority of the resulting blended force command. In some other such embodiments, the forward-looking information may be indicative of a large road feature (e.g., a hill or other road feature that is larger than a threshold size, length, and/or time duration during traversing) that cannot be fully compensated for by the isolation control module. According to this example, a floor may be applied to the blend ratio to set a minimum contribution from a tracking control module into an overall output that avoids end of travel events. In still other embodiments, the forward-looking information may be employed as a part of a computation in combination with the output from the isolation control module.

In some embodiments as shown in FIG. 5, optionally user input 222 may contribute to a determination of the blend ratio in block 212. For example, the user input 222 may be received at a user interface from a user of the vehicle. The user input may be indicative of a setting or operating mode, in some embodiments. The vehicle control system 200 may determine the blend ratio in block 212 based at least partly on the user input, for example, by updating one or more parameters in the determination of the blend ratio based on the isolation control module 208 output. In the example of the user input 222 being a mode, in a comfort mode the blend ratio determination may be set to favor more of an isolation control module to maximize vehicle body isolation. For example, in some embodiments, the blend ratio may have one or more parameters modified to be less sensitive to increases in the isolation control module output (e.g., a proportional coefficient may be reduced). As another example, in some embodiments, a ceiling for the blend ratio may be set such that the tracking control module contribution to the blended force 218 is capped. In a sport mode, the blend ratio determination may be set to favor more of a tracking control module to introduce from motion into the vehicle body for driving feedback. For example, in some embodiments, the blend ratio may have one or more parameters modified to be more sensitive to increases in the isolation control module output (e.g., a proportional coefficient may be increased). As another example, in some embodiments, a floor for the blend ratio may be set such that the tracking control module contribution to the blended force 218 may have a nonzero predetermined minimum value. Other modes are also contemplated, as the present disclosure is not so limited in this regard.

In some cases, the inventors have recognized that the raw blend ratio determined in block 212 may vary rapidly, as it is a function of the instantaneous isolation force command from the isolation control module 208. To suppress repeated cycling between full tracking and full isolation control, in some embodiments in block 214 a hit/hold module may be applied to the raw blend ratio determined in block 212. The hit/hold module may enforce a predetermined blend ratio if a road event longer than a threshold duration is detected. In some embodiments, the hit/hold module may maintain the blend ratio greater than a threshold blend ratio for a predetermined time period (e.g., the hit/hold module may enforce a floor for the blend ratio for the predetermined time period). For example, the hit/hold module may assign the blend ratio a value of 1 if a road event longer than a threshold duration is detected. In some embodiments, the threshold duration may be one second. In some embodiments, the predetermined time period may be approximately one second, though time periods both greater and less than one second may also be used as the disclosure is not so limited. Relating to prior examples herein, the road features of FIG. 2 may be traversed over a time period less than a threshold duration, whereas the road feature of FIG. 3 may be traversed over a time period greater than a threshold duration. In some embodiments, the hit/hold module may assign the blend ratio a floor different than 1. In some embodiments, the block 214 may further smooth the variation in the blend ratio by applying a low-pass filter to obtain a filtered blend ratio. The low-pass filter may remove high frequency content that may be undesirable for suspension control. Appropriate frequencies cut offs for the low-pass filter may include 0.5-2 Hz. The smoothing of block 214 may be optional, in some embodiments. After the smoothing of block 214, the filtered and/or smoothed blend ratio may be employed to determine the contributions of the isolation control module 208 and the tracking control module 210 in block 216. From this determination, a blended force 218 output may be obtained, which may be employed to command the various actuators in an active suspension system.

The blended force 218 output of the process described with reference to FIG. 5 is an overall force output to reflect a desired control of the vehicle body. The blend force output may be allocated to individual actuators of an active suspension system by a separate process of the vehicle control system. It should also be noted that while a specific formula for the application of the blend ratio is described with reference to FIG. 5, other formulas may be employed, as the present disclosure is not so limited in this regard. For example, the isolation control module 208 and tracking control module 210 may have different gains such that the scale of their respective outputs is not equal. Accordingly, in some embodiments, the blend ratio values and the formula for determining the blended force 218 may vary to compensate for these differences in scale.

Figure 6:
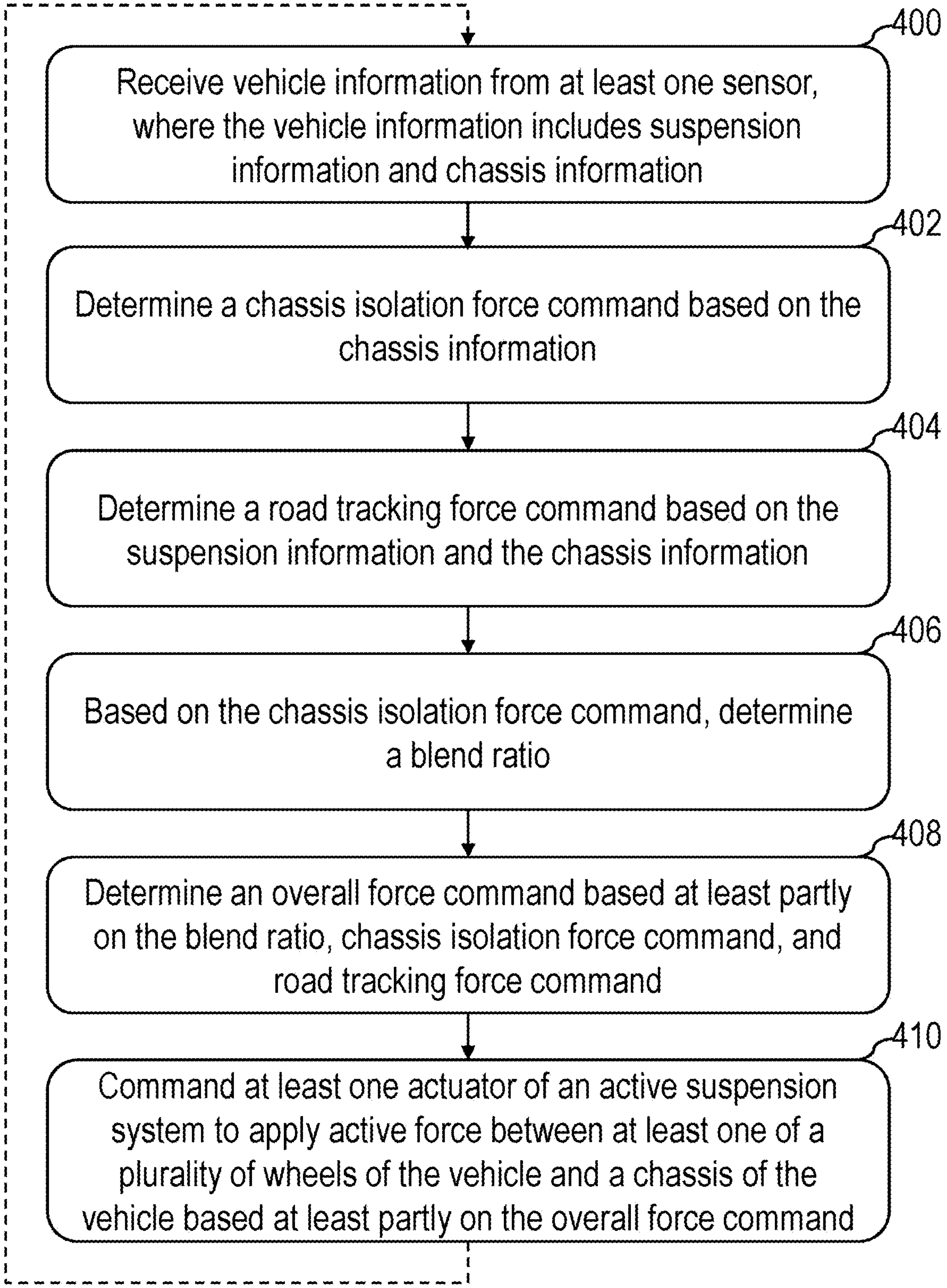
FIG. 6 is a flow chart of one embodiment of a method of controlling a vehicle.

FIG. 6 is a flow chart of one exemplary embodiment of a method of controlling a vehicle. In block 400, vehicle information is received from at least one sensor. The vehicle information may include suspension information (e.g., a suspension parameter such as suspension velocity), and vehicle body information (e.g., a vehicle body parameter such as vehicle body velocity). In block 402, a vehicle body isolation force command is determined by an isolation control module based on the vehicle body information. For example, the vehicle body isolation force command may be determined based solely on a vehicle body velocity, in some embodiments. In block 404, a road tracking force command is determined by a tracking control module based on the suspension information and the vehicle body information. For example, the road tracking force command may be determined based on a vehicle body velocity and a suspension velocity.

In block 406, a blend ratio is determined by a blending module, for example, based on the vehicle body isolation force command. In some embodiments, the blend ratio may be proportional to the vehicle body isolation force command from block 402 as described previously above. In some embodiments, the blend ratio may vary between 0 and 1, and may represent a ratio or weighting factor. In block 408, an overall force command is determined based at least partly on the blend ratio, vehicle body isolation force command, and road tracking force command. For example, in some embodiments, the vehicle body isolation force command and the road tracking force command may each make of a percentage component of the overall force command based on the blend ratio. For example, if the blend ratio were 0.25, the overall force command would be a sum composed of 25% of the road tracking force command and 75% of the vehicle body isolation force command. According to this example, the overall force command may include a first portion and a second portion, where the first portion is based on the blend ratio and the vehicle body isolation force command, and the second portion is based on the blend ratio and the road tracking force command. In some embodiments, the first portion may be proportional to the blend ratio and the vehicle body isolation force command, and the second portion may be proportional to the blend ratio and the road tracking force command. The overall force command may be representative of a force requested by the vehicle control system to achieve a desired motion of the vehicle body (e.g., a blend of isolation control and tracking control). In block 410, at least one actuator of the active suspension system may be commanded to apply an intervening force between at least one of a plurality of wheels of the vehicle and a vehicle body of the vehicle based at least partly on the overall force command.

Optionally, the method of FIG. 6 may be repeated during active control of the vehicle. In some embodiments, the method of FIG. 6 may be performed by a vehicle control system, and in particular at least one processor of a vehicle control system. The method of FIG. 6 may be stored as computer readable instructions in a non-transitory computer-readable medium for execution by at least one processor. In some embodiments, the steps of FIG. 6 may be reordered. For example, the road tracking force command may be determined prior to the isolation force command. In some embodiments, some of the steps of FIG. 6 may be performed concurrently in parallel. For example, the road tracking force command may be determined at the same time as the isolation force command as part of a parallel process.

Figure 7:
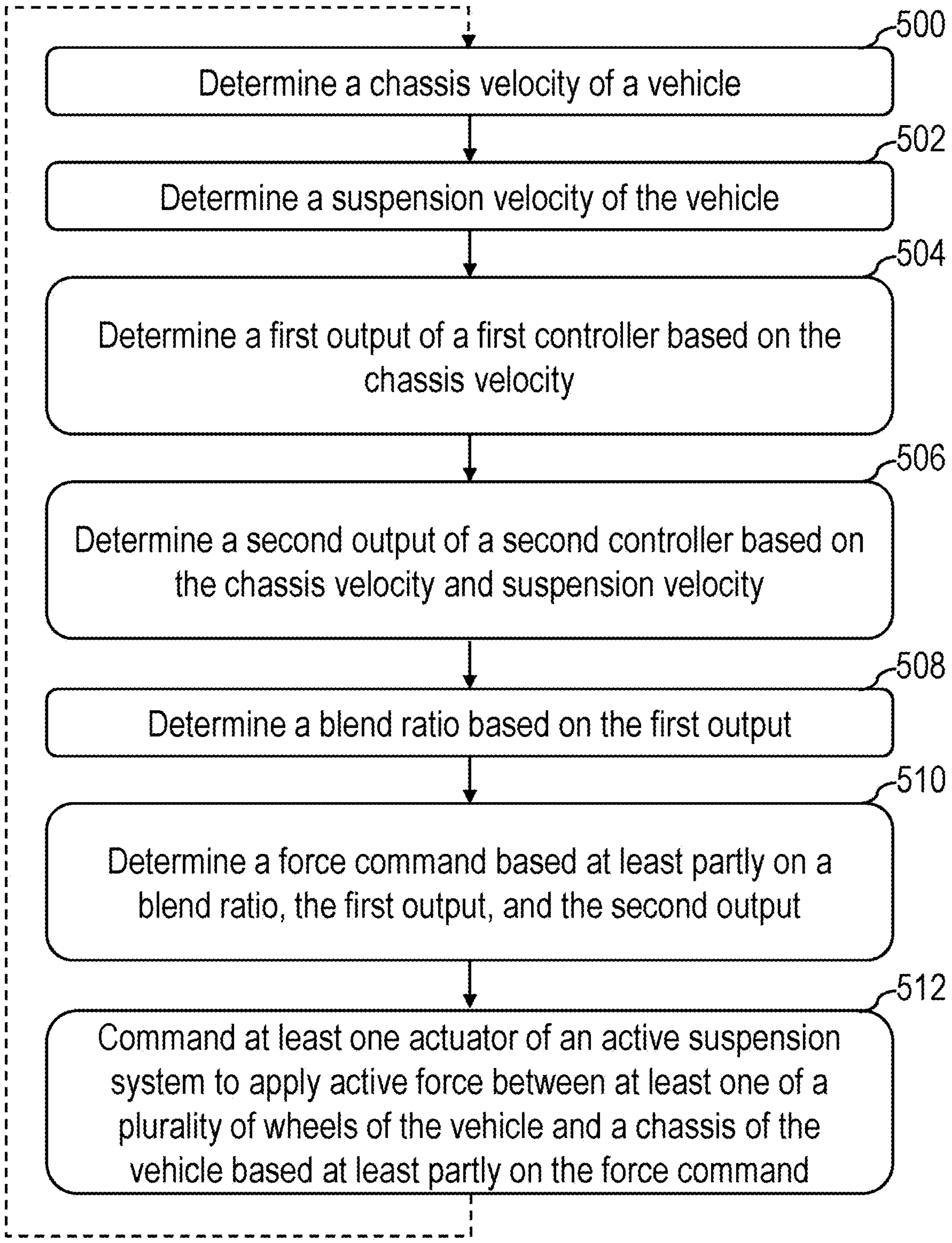
FIG. 7 is a flow chart of another embodiment of a method of controlling a vehicle.

FIG. 7 is a flow chart of another embodiment of a method of controlling a vehicle. In block 500, a vehicle body velocity of the vehicle is determined. For example, information from a sensor such as an accelerometer may be employed to determine a velocity of the vehicle body. In block 502, a suspension velocity (e.g., a suspension parameter) of the vehicle is determined. For example, one or more suspension sensors (e.g., accelerometers) and/or feedback from a suspension actuator may be employed to determine the velocity of the suspension or wheel along its range of motion. In block 504, a first output of a first control module is determined based on the vehicle body velocity (e.g., a vehicle body parameter). For example, the first control module may be an isolation control module implementing stiff skyhook control, or other sky hook control, based on the vehicle body velocity as an input. In some embodiments, the first output may be a first force command. In block 506, a second output of a second control module is determined based on the vehicle body velocity and the suspension velocity. For example, the second control module may be a road tracking control module implementing weak skyhook or weak groundhook control, which offers a reduced level of skyhook control as compared to the isolation control module, based on the vehicle body velocity as an input. In some embodiments, the second output may be a second force command.

In block 508, a blend ratio is determined based on the first output. In some embodiments, the blend ratio may be proportional to the first output from block 504. In some embodiments, the blend ratio may vary between 0 and 1, and may represent a ratio or weighting factor. In block 510, a force command is determined based at least partly on the blend ratio, first output, and road second output. For example, in some embodiments, the first output and the second output may each make of a percentage component of the force command based on the blend ratio. For example, if the blend ratio were 0.50, the force command would be a sum composed of 50% of the first output and 50% of the second output. According to this example, the force command may include a first portion and a second portion, where the first portion is based on the blend ratio and the first output, and the second portion is based on the blend ratio and the second output. In some embodiments, the first portion may be proportional to the blend ratio and the first output, and the second portion may be proportional to the blend ratio and the second output. The force command may be representative of a force requested by the vehicle control system to achieve a desired motion of the vehicle body (e.g., a blend of the two controllers). In block 512, at least one actuator of the active suspension system may be commanded to apply active force between at least one of a plurality of wheels of the vehicle and a chassis or body of the vehicle based at least partly on the force command.

Optionally, the method of FIG. 7 may be repeated during active control of the vehicle. In some embodiments, the method of FIG. 7 may be performed by a vehicle control system, and in particular at least one processor of a vehicle control system. The method of FIG. 7 may be stored as computer readable instructions in non-transitory computer-readable medium for execution by at least one processor. In some embodiments, the steps of FIG. 7 may be reordered. For example, the second output may be determined prior to the first output. In some embodiments, some of the steps of FIG. 6 may be performed concurrently in parallel. For example, the first output may be determined at the same time as the second output as part of a parallel process.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively, or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A vehicle comprising:

a vehicle body;

a plurality of wheels;

an active suspension system operatively coupled to the plurality of wheels and the vehicle body, wherein the active suspension system comprises at least one actuator configured to apply active forces to at least one of the plurality of wheels in at least one mode of operation; and at least one processor configured to control the active suspension system, wherein the at least one processor is configured to:

determine a first force command based on a vehicle body parameter, determine a second force command based on the vehicle body parameter and a suspension parameter, determine a blend ratio based at least partly on the first force command, determine a third force command based at least partly on the blend ratio, the first force command, and the second force command, and command the at least one actuator to apply force between at least one of the plurality of wheels and the vehicle body based at least partly on the third force command.

2. The vehicle of claim 1, wherein the vehicle body parameter is a vehicle body velocity, and wherein the suspension parameter is a suspension velocity.

3. The vehicle of claim 1, further comprising at least one first sensor and at least one second sensor, wherein the at least one processor is further configured to:

receive vehicle information from the at least one first sensor;

determine the vehicle body parameter based on the vehicle information;

receive suspension information from the at least one second sensor; and determine the suspension parameter based on the suspension information.

4. The vehicle of claim 3, wherein the at least one first sensor comprises a first accelerometer disposed on the vehicle body, and wherein the at least one second sensor comprises an accelerometer disposed on the active suspension system.

5. The vehicle of claim 1, wherein determining the third force command comprises:

determining a first portion of the third force command based on the blend ratio and the first force command; and determining a second portion of the third force command based on the blend ratio and the second force command.

6. The vehicle of claim 5, wherein the first portion of the third force command is proportional to the blend ratio and the first force command, and wherein the second portion of the third force command is proportional to the blend ratio and the second force command.

7. The vehicle of claim 5, wherein the at least one processor is further configured to:

determine if a road event is longer than a threshold duration is occurring; and upon determining the road event longer than the threshold duration is occurring, maintain the blend ratio greater than a threshold blend ratio for a predetermined time period.

8. The vehicle of claim 5, wherein the first portion of the third force command is proportional to an antecedent of the blend ratio, and wherein the second portion of the third force command is proportional to a consequent of the blend ratio.

9. The vehicle of claim 8, wherein the antecedent of the blend ratio is between 0 and 1, wherein the consequent of the blend ratio is between 0 and 1, and wherein the antecedent and consequent sum to 1.

10. The vehicle of claim 5, wherein the at least one processor is further configured to:

apply a low-pass filter to the blend ratio to obtain a filtered blend ratio, wherein the first portion of the third force command is determined based on the filtered blend ratio, and wherein the second portion of the third force command is determined based on the filtered blend ratio.

11. The vehicle of claim 1, wherein the first force command is configured to isolate the vehicle body from movement, and wherein the second force command is configured to move the vehicle body with a road surface.

12. The vehicle of claim 1, wherein the third force command is configured to control a heave and/or pitch of the vehicle.

13. The vehicle of claim 1, further comprising a user interface, wherein the user interface is configured to receive input from a user, and wherein the at least one processor is further configured to determine the blend ratio based at least partly on the input from the user.

14. The vehicle of claim 1, further comprising a forward-looking sensor configured to obtain forward-looking road information, wherein the at least one processor is further configured to determine the blend ratio based at least partly on the forward-looking road information.

15. The vehicle of claim 1, wherein the first force command is a first output from a first control module, and wherein the second force command is a second output from a second control module.

16. The vehicle of claim 1, wherein the at least one processor is further configured to determine the blend ratio to avoid exceeding a wheel travel threshold of the plurality of wheels.

17. A method of controlling a vehicle comprising:

determining a first force command based on a vehicle body parameter, determining a second force command based on the vehicle body parameter and a suspension parameter, determining a blend ratio based on the first force command, determining a third force command based at least partly on the blend ratio, the first force command, and the second force command, and commanding at least one actuator of an active suspension system to apply active force between at least one of a plurality of wheels of the vehicle and a vehicle body of the vehicle based at least partly on the third force command.

18. The method of claim 17, wherein the vehicle body parameter is a vehicle body velocity, and wherein the suspension parameter is a suspension velocity.

19. The method of claim 17, further comprising:

receiving vehicle information from at least one first sensor;

determining the vehicle body parameter based on the vehicle information;

receiving suspension information from at least one second sensor; and determining the suspension parameter based on the suspension information.

20. The method of claim 19, wherein the at least one first sensor comprises a first accelerometer disposed on the vehicle body, and wherein the at least one second sensor comprises an accelerometer disposed on the active suspension system.

21. The method of claim 17, wherein determining the third force command comprises:

determining a first portion of the third force command based on the blend ratio and the first force command; and determining a second portion of the third force command based on the blend ratio and the second force command.

22. The method of claim 21, wherein the first portion of the third force command is proportional to the blend ratio and the first force command, and wherein the second portion of the third force command is proportional to the blend ratio and the second force command.

23. The method of claim 21, further comprising:

determining if a road event longer than a threshold duration is occurring; and upon determining the road event longer than the threshold duration is occurring, hold the blend ratio greater than a threshold blend ratio for a predetermined time period.

24. The method of claim 21, wherein the first portion of the third force command is proportional to an antecedent of the blend ratio, and wherein the second portion of the third force command is proportional to a consequent of the blend ratio.

25. The method of claim 24, wherein the antecedent of the blend ratio is between 0 and 1, wherein the consequent of the blend ratio is between 0 and 1, and wherein the antecedent and consequent sum to 1.

26. The method of claim 21, further comprising applying a low-pass filter to the blend ratio to obtain a filtered blend ratio, wherein the first portion of the third force command is determined based on the filtered blend ratio, and wherein the second portion of the third force command is determined based on the filtered blend ratio.

27. The method of claim 17, wherein the first force command is configured to isolate the vehicle body from movement, and wherein the second force command is configured to move the vehicle body with a road surface.

28. The method of claim 17, wherein the third force command is configured to control a heave and/or pitch of the vehicle.

29. The method of claim 17, further comprising receive input from a user at a user interface, wherein determining the blend ratio is based at least partly on the input from the user.

30. The vehicle of claim 17, further comprising obtaining forward-looking road information with a forward-looking sensor, wherein determining the blend ratio is based at least partly on the forward-looking road information.

31. The vehicle of claim 17, wherein the first force command is a first output from a first control module, and wherein the second force command is a second output from a second control module.

32. The vehicle of claim 17, further comprising determining the blend ratio to avoid exceeding a wheel travel threshold of the plurality of wheels.

33. At least one non-transitory computer-readable medium comprising instructions thereon that, when executed by at least one processor, perform the method of claim 17.

* * * * *